(12) United States Patent
Sakamoto et al.

(10) Patent No.: US 10,836,219 B2
(45) Date of Patent: Nov. 17, 2020

(54) PNEUMATIC TIRE

(71) Applicant: The Yokohama Rubber Co., LTD., Tokyo (JP)

(72) Inventors: Hayato Sakamoto, Hiratsuka (JP); Yoshiaki Hashimura, Hiratsuka (JP); Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 504 days.

(21) Appl. No.: 15/501,806

(22) PCT Filed: Aug. 4, 2015

(86) PCT No.: PCT/JP2015/072125
§ 371 (c)(1),
(2) Date: Feb. 3, 2017

(87) PCT Pub. No.: WO2016/021613
PCT Pub. Date: Feb. 11, 2016

(65) Prior Publication Data
US 2017/0232806 A1 Aug. 17, 2017

(30) Foreign Application Priority Data
Aug. 4, 2014 (JP) .................... 2014-158413

(51) Int. Cl.
*B60C 19/00* (2006.01)
*B60C 23/04* (2006.01)
(Continued)

(52) U.S. Cl.
CPC .......... *B60C 19/00* (2013.01); *B29D 30/0061* (2013.01); *B60C 17/00* (2013.01);
(Continued)

(58) Field of Classification Search
CPC ..... B60C 19/00; B60C 19/002; B60C 19/003; B60C 17/00; B60C 23/0493; B29D 30/0061; B29D 2030/0072
See application file for complete search history.

(56) References Cited

U.S. PATENT DOCUMENTS 5,919,864 A * 7/1999 Watanabe ............... C08L 83/04
525/166
6,217,683 B1 4/2001 Balzer et al.
(Continued)

FOREIGN PATENT DOCUMENTS

| JP | 2002-502765 | 1/2002 |
|----|-------------|--------|
| JP | 2005-517581 | 6/2005 |

(Continued)

OTHER PUBLICATIONS

International Search Report for International Application No. PCT/JP2015/072125 dated Oct. 6, 2015, 4 pages, Japan.

*Primary Examiner* — Katelyn B Whatley
*Assistant Examiner* — Philip N Schwartz
(74) *Attorney, Agent, or Firm* — Thorpe North & Western

(57) ABSTRACT

A pneumatic tire (1) includes a mechanical fastener (3) formed of at least two or more fastener components (3a, 3b) and attached to a tire inner surface (2). In such a pneumatic tire (1), the two or more fastener components (3a, 3b) of the mechanical fastener (3) are fixed with a resin reinforcement member (7) sandwiched therebetween, the resin reinforcement member (7) including at least one layer of a resin film or resin sheet including any of: (a) a resin or a resin composition made of a blend of resin and an elastomer; (b) a resin or a resin composition made of a blend of a resin and an elastomer including arranged fibers; and (c) a resin or a resin composition made of a blend of a resin and an elastomer with short fibers compounded therein.

15 Claims, 6 Drawing Sheets

(51) Int. Cl.
  *B29D 30/00* (2006.01)
  *B60C 17/00* (2006.01)
(52) U.S. Cl.
  CPC .......... *B60C 19/002* (2013.01); *B60C 19/003* (2013.01); *B60C 23/0493* (2013.01); *B29D 2030/0072* (2013.01)

(56) References Cited

U.S. PATENT DOCUMENTS

| | | | |
|---|---|---|---|
| 2002/0139288 A1* | 10/2002 | Evans | B60C 23/02 |
| | | | 116/34 R |
| 2003/0155054 A1 | 8/2003 | Bell | |
| 2006/0260726 A1 | 11/2006 | Bell | |
| 2010/0108222 A1 | 5/2010 | Bell | |
| 2011/0113630 A1 | 5/2011 | Bell | |
| 2012/0024439 A1 | 2/2012 | Tanno et al. | |
| 2014/0179837 A1* | 6/2014 | Hahn | C08L 7/00 |
| | | | 523/467 |

FOREIGN PATENT DOCUMENTS

| | | |
|---|---|---|
| JP | 2006-044503 | 2/2006 |
| JP | 2007-062405 | 3/2007 |
| JP | 2009-298329 | 12/2009 |
| JP | 2012-025318 | 2/2012 |
| JP | 2012-240465 | 12/2012 |
| WO | WO 1999/41093 | 8/1999 |
| WO | WO 2000/47430 | 8/2000 |
| WO | WO 2003/070496 | 8/2003 |

* cited by examiner

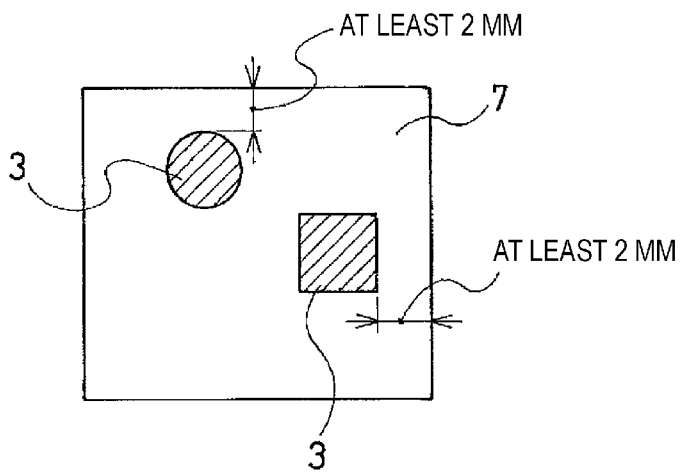
FIG. 5
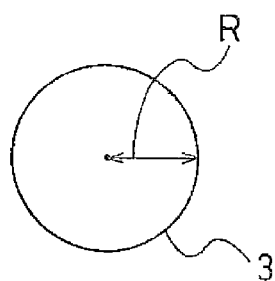   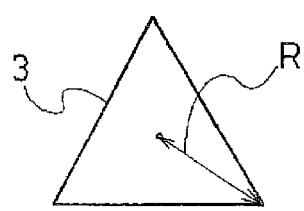   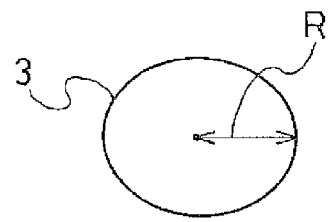
FIG. 6A    FIG. 6B    FIG. 6C
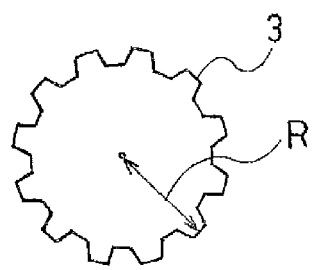
FIG. 6D

PNEUMATIC TIRE

TECHNICAL FIELD

The present technology relates to a pneumatic tire, and more specifically to a pneumatic tire that allows an object to be securely attached to an inner surface of the pneumatic tire and retained thereon over an extended period of time.

BACKGROUND ART

In recent years, various attempts have been made to dispose objects having various specific functions on an inner surface of a pneumatic tire.

For example, an attaching method has been proposed in which a tire tag (radio frequency identification tag), a chip, a noise absorbing member, or the like is attached to an inner liner or the like of a green tire using a so-called surface fastener, such as a hook and loop fastener or a hook and hook fastener (see Japanese Unexamined Patent Application Publication Nos. 2005-517581A and 2006-044503A).

The surface fasteners proposed in Japanese Unexamined Patent Application Publication Nos. 2005-517581A and 2006-044503A are preferred from the perspectives of achieving a relatively strong engagement force when attached, and allowing engagement on a surface regardless of slight misalignments during attachment. However, repetitive deformation and compaction of the tire inner surface over an extended period of time caused by tire rolling at high speeds and at relatively high temperatures results in partial physical deterioration. Progress in such physical deterioration causes a deterioration/decline over time in the engagement force of an entirety of the surface fastener, which makes it difficult to maintain a desired engagement force over an extended period of time.

In response, the inventors of the present technology have previously proposed a pneumatic tire that includes a first fastener of a separatable pair of mechanical fasteners disposed on a tire inner surface (see Japanese Unexamined Patent Application Publication Nos. 2012-025318A and 2012-0240465A). With this pneumatic tire, the aforementioned problems are substantially nonexistent. In particular, obtained engagement force is great and is essentially free of variations (positional variation within the tire and variation from tire to tire). Additionally, the engagement force deteriorates/declines minimally over time even under the harsh usage condition of repetitive deformation and compaction of the tire inner surface over an extended period of time caused by tire rolling at high speeds in a state of relatively elevated temperatures. Without such problems, the desired engagement force can be maintained over an extended period of time.

Approaches using this mechanical fastener are superior from the perspectives of the obtained engagement force, variations in the engagement force, reliability in the engagement operation, and the like. With regard to an attachment method for providing the first fastener to the tire inner surface, the inventors of the present technology previously proposed embedding and vulcanizing the fasteners one by one into the tread rubber, and providing a first mechanical fastener of a separatable pair of mechanical fasteners to the tire inner surface. The first mechanical fastener is formed of at least two or more fastener components, and the two or more fastener components are fixed with a rubber layer (a tire component) or a rubber-covered fiber reinforcement member sandwiched therebetween (Japanese Unexamined Patent Application Publication No. 2012-025318A).

Further, the inventors of the present technology previously proposed providing the first mechanical fastener of the pair of mechanical fasteners to the tire inner surface by fixing the two or more fastener components with a woven fabric or a nonwoven fabric made of fibers sandwiched therebetween (Japanese Unexamined Patent Application Publication No. 2012-240465A).

These methods, however, are problematic in that the desired attachment strength cannot always be achieved depending on the shape and attachment position of the mechanical fastener. Such problems have resulted in failure to adequately achieve the durability and long service life required of a pneumatic tire in which an object having a specific function is disposed.

It is required that this mechanical fastener exhibit a higher attachment strength and a long service life to adapt to the properties (weight, size, shape, and the like) unique to the object having a specific function and disposed in the tire.

SUMMARY

In light of the foregoing, the present technology achieves a mechanical fastener wherein an obtained engagement force is great, is essentially free of variations (positional variation within the tire and variation from tire to tire), and deteriorates/declines minimally over time even under the harsh usage condition of repetitive deformation and compaction of the tire inner surface over an extended period of time caused by tire rolling at high speeds and at relatively high temperatures. Additionally, an the present technology provides a pneumatic tire that includes the mechanical fastener on a tire inner surface, the mechanical fastener offering high attachment strength to the tire inner surface and being effective in attaching and retaining, over an extended period of time, a desired functional object having a specific function and unique properties (weight, size, shape, etc.).

A pneumatic tire of the present technology t has the configuration (1) below.

(1) A pneumatic tire includes a mechanical fastener formed of at least two or more fastener components and attached to a tire inner surface, the mechanical fastener being a first mechanical fastener of a separatable pair of mechanical fasteners. In such a pneumatic tire, the two or more fastener components are fixed with a resin reinforcement member sandwiched therebetween, the resin reinforcement member including at least one layer of a resin film or resin sheet including any of:

(a) a resin or a resin composition made of a blend of a resin and an elastomer;

(b) a resin or a resin composition made of a blend of a resin and an elastomer including arranged fibers; and (c) a resin or a resin composition made of a blend of a resin and an elastomer with short fibers compounded therein.

Specifically, the pneumatic tire according to the present technology is preferably configured as described in any of (2) to (11) below.

(2) The pneumatic tire described in (1), wherein an attachment position of the mechanical fastener is within a region in which a distance D (mm) in a tire width direction between a center position C of the mechanical fastener and a tire equator line L satisfies the relationship $0 \leq D/W \leq 0.40$ with respect to a maximum width W (mm) of the tire.

(3) The pneumatic tire described in (1), wherein an attachment position of the mechanical fastener is within a region in which a tire radial direction height A from a bead toe tip to the center position of the mechanical fastener and a tire cross-sectional height H satisfy the relationship $0.05 \leq A/H \leq 0.4$.

(4) The pneumatic tire described in any one of (1) to (3), wherein the resin reinforcement member fixed between the mechanical fasteners is directly adhered to the tire inner surface or is fixed to the tire inner surface via an adhesive layer at a boundary between the resin reinforcement member and the tire inner surface.

(5) The pneumatic tire described in any one of (1) to (4), wherein a stiffness constant S expressed by a product of a storage elastic modulus K (GPa) of the resin film or resin sheet and a thickness T (mm) of the resin film or resin sheet satisfies $0.005 \leq S \leq 5$.

(6) The pneumatic tire described in any one of (1) to (5), wherein a surface area S2 ($cm^2$) per mechanical fastener of the resin film or resin sheet sandwiched between the fastener components is from 8 to 300 $cm^2$.

(7) The pneumatic tire described in any one of (1) to (6), wherein the mechanical fastener is disposed so that a profile line of the mechanical fastener is at least 2 mm away from a profile line of the resin reinforcement member, and is positioned on an inner side of the profile line of the resin reinforcement member.

(8) The pneumatic tire described in any one of (1) to (7), wherein a profile shape of the mechanical fastener obtained by projecting the fastener onto the tire inner surface exhibits a distance R from a center of gravity position of the profile shape to a farthest point on the profile line of from 2 to 60 mm.

(9) The pneumatic tire described in any one of (1) to (8), wherein a profile shape of the resin film or resin sheet in a plan view is formed of a curved line having a radius of curvature of at least 5 mm without any acute angle portion, or is formed of a combination of a straight line and a curved line having a radius of curvature of at least 5 mm.

(10) The pneumatic tire described in any one of (1) to (9), wherein an object including a second mechanical fastener that engages with the first mechanical fastener on the tire inner surface is fixed to the tire inner surface by engagement of the first mechanical fastener and the second mechanical fastener.

(11) The pneumatic tire described in (10), wherein the object including the second fastener is formed of one or a combination of (a) an electronic circuit including a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

With the present technology according to claim 1, it is possible to achieve a mechanical fastener wherein the obtained engagement force is great, is essentially free of variations (positional variation within the tire and variation from tire to tire), and deteriorates/declines minimally over time even under the harsh usage condition of repetitive deformation and compaction of the tire inner surface over an extended period of time caused by tire rolling at high speeds and relatively high temperatures. Additionally, it is possible to achieve a pneumatic tire that includes the mechanical fastener offering high attachment strength to a tire inner surface.

Thus, with the present technology according to claim 1, in addition to the effects described above, a pneumatic tire is achieved that includes a superior mechanical fastener in a tire interior, making it possible to attach various desired functional objects, each having a specific function and unique properties (weight, size, shape, and the like), and maintain and exhibit the function over an extended period of time, essentially without limitation or restriction by the properties or the like.

With the present technology according to any one of claims 2 to 9, a superior pneumatic tire is achieved that can exhibit greater and more reliable effects than those of the pneumatic tire of the present technology according to claim 1.

With the present technology according to claim 10 or 11, a novel pneumatic tire is achieved in which a specific functional object having a desired functionality can be attached to a tire inner surface while realizing a great engagement force and superior durability, or a novel pneumatic tire having the functional object attached to the tire inner surface thereof is achieved.

BRIEF DESCRIPTION OF DRAWINGS

FIG. 1A is a partially fractured cross-sectional perspective view of one embodiment of the pneumatic tire of the present technology, and FIG. 1B is an external perspective model view illustrating a state in which two members constituting a first mechanical fastener of a separatable pair of mechanical fasteners used on a pneumatic tire of the present technology are engaged with each other with one layer of a resin reinforcement member sandwiched therebetween.

FIG. 5 is a schematic plan view illustrating a preferred state of a relationship between a profile line of a mechanical fastener 3 and a profile line of a resin reinforcement member 7.

FIGS. 6A to 6D are each a plan view illustrating a preferred exemplary shape of the mechanical fastener that can be used in the present technology, and are each particularly a drawing for explaining a profile shape of the mechanical fastener 3 in a plan view.

DETAILED DESCRIPTION

A detailed explanation of the pneumatic tire of the present technology will be given below.

Figure 1A:
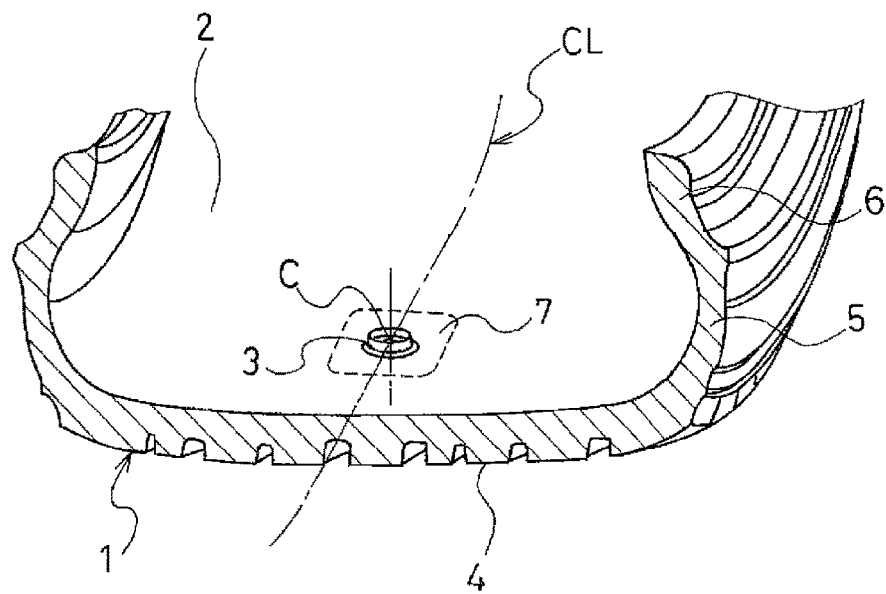
FIGS. 1A and 1B are both drawings for explaining one embodiment of a pneumatic tire of the present technology.
Figure 1B:
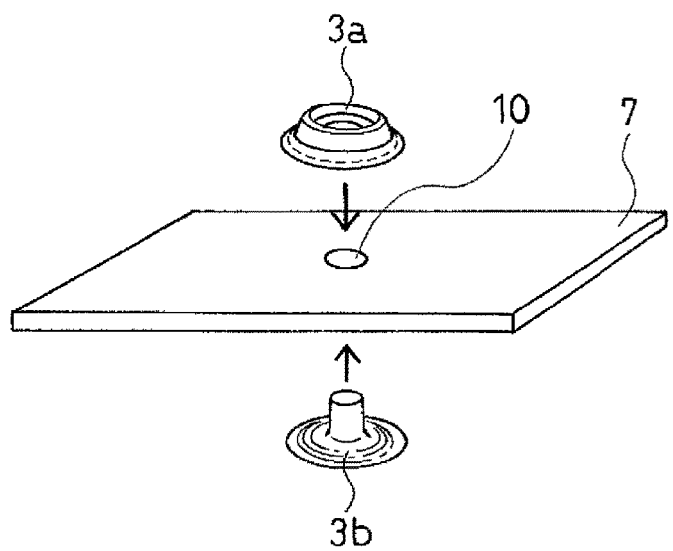

As illustrated in FIGS. 1A and 1B, a pneumatic tire 1 of the present technology includes a mechanical fastener 3 formed by at least two or more fastener components 3a, 3b and attached to a tire inner surface 2, the mechanical fastener being a first mechanical fastener of a separatable pair of mechanical fasteners. In such a mechanical fastener 3, the two or more fastener components 3a, 3b are fixed with a resin reinforcement member 7 sandwiched therebetween, the resin reinforcement member 7 including at least one layer of a resin film or resin sheet including any of:

(a) a resin or a resin composition made of a blend of a resin and an elastomer;

(b) a resin or a resin composition made of a blend of a resin and an elastomer including arranged fibers; and (c) a resin or a resin composition made of a blend of a resin and an elastomer, with short fibers compounded therein. In FIGS. 1A and 1B, 4 denotes a tread portion, 5 denotes a side wall portion, 6 denotes a bead portion, and 10 denotes a hole formed in the resin reinforcement member 7 through which the fastener components 3a, 3b are inserted to form the mechanical fastener 3.

In the present technology, a mechanical fastener is formed of a pair of fasteners separatable into two fasteners 3 and physically re-engageable with each other, and capable of repeatedly freely engaging with and separating from each other, which is basically similar to those in Patent Documents 3 and 4 described above. The first mechanical fastener 3 of the separatable pair of mechanical fasteners is normally formed of two components 3a, 3b. Exemplary types of such a mechanical fastener are those known as "hooks" or "snaps." Specific examples of products in the clothing industry and the like that are generally included as mechanical fasteners are snap buttons, ring snaps, ring hooks, American snaps, American hooks, eyelet hooks, spring hooks, and jumper hooks.

Such a mechanical fastener differs from a so-called surface fastener in that while the area of the engaging part of a surface fastener is unlimited in the entire area, the area of the engaging part of a mechanical fastener is small (preferably from about 1 to 115 mm$^2$ and more preferably from about 4 to 90 mm$^2$, for example). In other words, a mechanical fastener is a point fastener. That is, even when engaged over a small area of from about 1 to 115 mm$^2$ for example, strong engaging is achieved due to a mechanical male-female structure or the like. Thus, a conventional structure may be used for the mechanical fastener. The mechanical fastener is formed from a material such as metal, rubber, or synthetic resin.

In the present technology, when the fastener components 3a, 3b are engaged with and fixed to each other, the resin reinforcement member 7 that includes at least one layer of a resin film or resin sheet including any of (a) to (c) described above and has a high fracture strength is used as a sandwiched member, making it possible to enhance a breakage strength (an insusceptibility to breakage) of the tire inner surface 2 near the position where the mechanical fastener 3 is fixed. As a result, an attachment strength of the mechanical fastener 3 to the tire inner surface is remarkably enhanced.

The resin that constitutes the resin film or resin sheet may be a thermoplastic resin or a thermosetting resin, but is preferably a thermoplastic resin due to its easy-to-handle characteristics. Among the thermoplastic resins, a resin composition of rubber blended with a nylon resin, a polyurethane elastomer (ether-based), a polyester polyol, and the like are preferred. Details will be described later. As the thermosetting resin, an epoxy resin, a phenolic resin, a urea resin, a melamine resin, an unsaturated polyester, a silicone resin, a polyurethane resin, and the like are preferred.

The resin reinforcement member may be completely formed of a resin or a resin composition described above. Alternatively, the resin reinforcement member may be formed of a resin or a resin composition made of a blend of a resin and an elastomer in which fibers are arranged or short fibers are compounded. Such a resin reinforcement member makes it possible to achieve a higher attachment strength of the mechanical fastener 3 to the tire inner surface.

The resin reinforcement member is formed of at least one layer of a resin film or resin sheet. The resin reinforcement member may be formed of only one layer of the resin film or resin sheet. Alternatively, the resin reinforcement member may be formed of a laminate in which the one layer of the resin film or resin sheet, and a plurality of other resin films or resin sheets are layered.

While the resin film or resin sheet is not particularly limited, the thickness of one layer of the resin film or resin sheet is preferably from 0.05 to 2.0 mm, and more preferably from 0.2 to 1.5 mm. The thickness of the overall resin reinforcement member is preferably from 0.2 to 5.0 mm, and more preferably from 1.0 to 3.0 mm.

The phrase "including arranged fibers" refers to, for example, the formation of a resin film or resin sheet in which a fiber sheet-like material having a plurality of fibers or fiber bundles aligned and arranged in one direction or a plurality of directions is impregnated or coated with a resin or a resin composition. Here, "arranged fibers" may be individual fibers arranged one by one, individual fiber bundles, each formed of a plurality of fibers gathered together and aligned or intertwined, arranged one by one, or individual thicker fiber bundles, each formed of a plurality of the fiber bundles aligned or intertwined, arranged one by one. The arrangement of the fibers or fiber bundles may be achieved by the alignment described above, or by the formation of a cord fabric or a plain weave that is impregnated or coated with a resin.

The phrase "short fibers compounded therein" refers to the formation of a resin film or resin sheet in which short fibers not bundled are dispersedly compounded into a resin or a resin composition made of a blend of a resin and an elastomer. Generally, the short fibers preferably have an average length of from 0.5 to 10 mm, and more preferably from 1 to 3 mm. In particular, from the perspectives of improving dispersibility and the like, it is good to use short fibers having an average length of 1.0 mm or less or the like.

In both (b) and (c) described above, the fibers are preferably chemical fibers or synthetic fibers from the perspectives of high physical properties, quality stability, and the like, and it is only required that long fibers (filament fibers) (in the case of (b)) and short fibers (in the case of (c)) be suitably used. The preferred fiber types are chemical fibers or synthetic fibers such as rayon fibers, nylon fibers, polyester fibers, and polyethylene fibers, from the perspectives of high quality, stable productivity, and the like.

Further, in both (b) and (c) described above, the compounding ratio (mixing ratio) of the fibers and the resin or the resin composition is preferably set so that the fibers constitute 2 to 20 mass % of the overall resin composition from the perspectives of the reinforcing effect, moldability of the resin film or resin sheet, dispersibility of the fibers, and the like.

The details of the resin or the resin composition made of a blend of a resin and an elastomer that serves as the main raw material of the resin film or resin sheet in (a) to (c) above will be described later.

The mechanical fastener 3 may be attached to a tire equator line CL such as illustrated in FIG. 1A, but is preferably attached in a more appropriate position depending on factors such as the characteristics and properties (size, shape, mass) of the various objects to be attached via the mechanical fastener.

A preferred example of the attachment position of the mechanical fastener is a region in which a distance D (mm) in a tire width direction between a center position C of the mechanical fastener and the tire equator line CL satisfies the relationship 0≤D/W≤0.40 with respect to a maximum width W (mm) of the tire.

Figure 2:
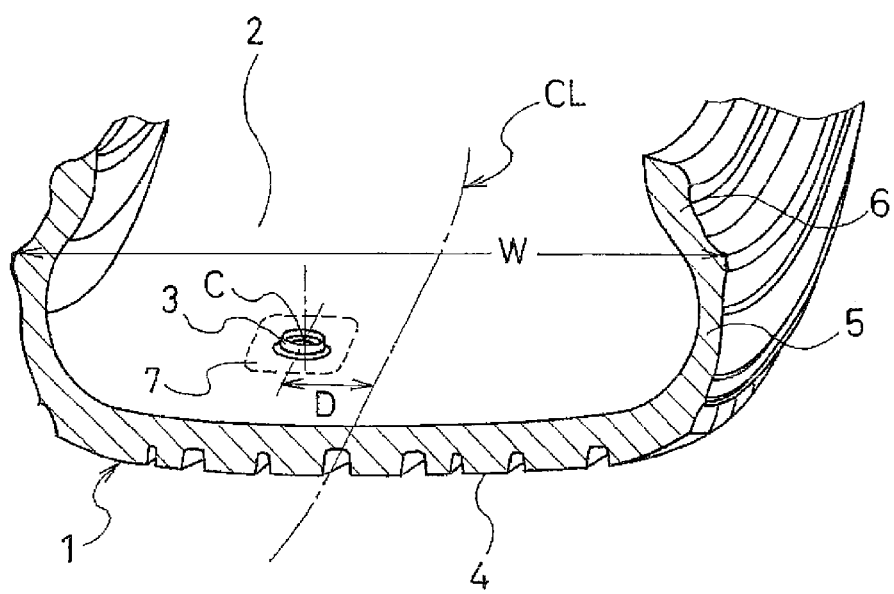
FIG. 2 is a drawing for explaining one embodiment of the pneumatic tire of the present technology, and is particularly a partially fractured cross-sectional perspective view illustrating a case where the mechanical fastener is provided to a tire center region.

For example, FIG. 2 illustrates one example in which the mechanical fastener 3 is attached in a position separated from the tire equator line CL by the distance D.

While the tire inner surface is repeatedly distorted at high speeds during tire rolling, resulting in movement over an extended period of time that can cause a fastener (fastener member) to fall off, provision of the mechanical fastener 3 to a region near the tire equator line (center) as illustrated in FIGS. 1A and 2 where there is relatively minimal distortion makes it possible to prevent the fastener (fastener member) from falling off during tire rolling.

Figure 3A:
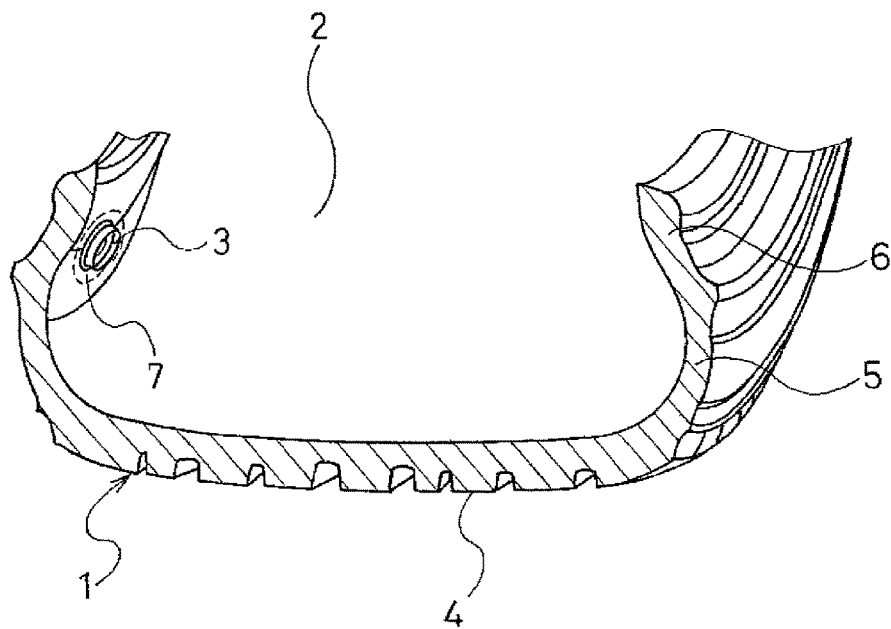
FIGS. 3A and 3B are both drawings for explaining one embodiment of the pneumatic tire of the present technology, and are particularly partially fractured cross-sectional perspective views illustrating a case where the mechanical fastener is provided to a tire bead portion region.
Figure 3B:
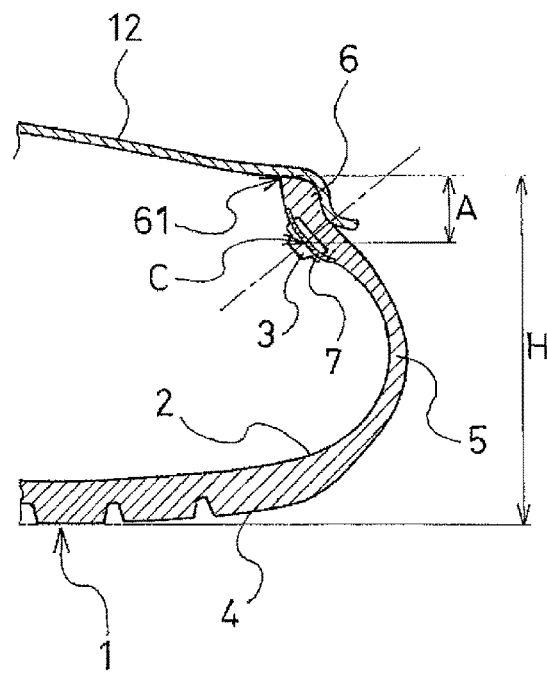

Alternatively, FIGS. 3A and 3B illustrate an example in which the mechanical fastener 3 is attached near the bead portion 6. As illustrated in the drawings, the attachment position of the mechanical fastener 3 is within a region in which a tire radial direction height A from a bead toe tip 61 to the center position C of the mechanical fastener and a tire cross-sectional height H satisfy the relationship 0.05≤A/H≤0.4. While the tire inner surface is distorted during tire rolling, resulting in movement that can cause the mechanical fastener 3 and the fastener components 3a, 3b to fall off, provision of the mechanical fastener 3 and the fastener components 3a, 3b within a region near this bead portion 6 where there is minimal rolling distortion makes it possible to prevent the fastener 3 and the fastener components 3a, 3b from falling off during the rolling.

Figure 4A:
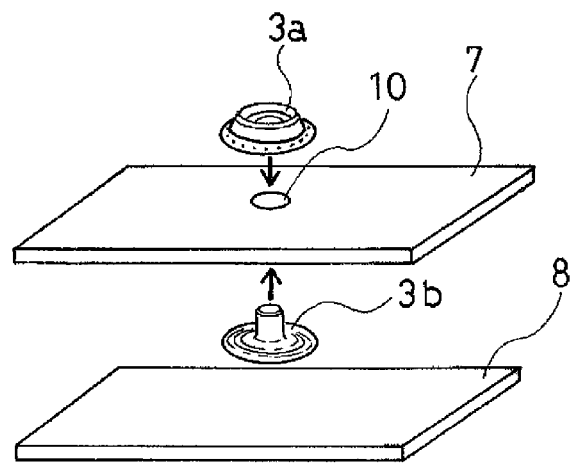
FIGS. 4A and 4B are external perspective model views illustrating a method for adhering the resin reinforcement member to a tire inner surface.
Figure 4B:
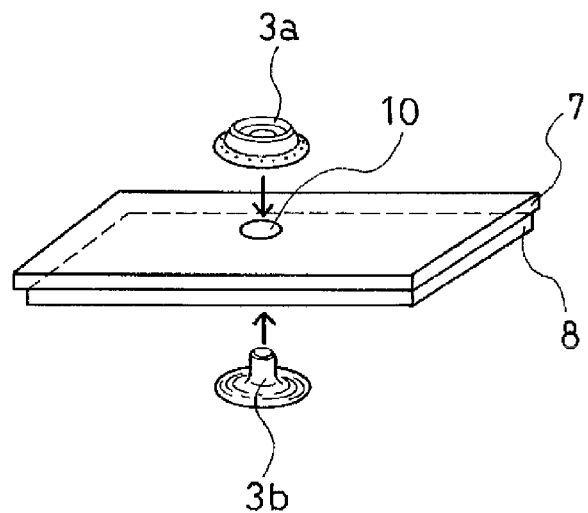

The resin reinforcement member 7 fixed between the fastener components 3a, 3b is preferably directly adhered to the tire inner surface or fixed to the tire inner surface via an adhesive layer 8 placed at the boundary between the resin reinforcement member 7 and the tire inner surface, as illustrated in FIGS. 4A and 4B.

Specifically, the resin reinforcement member is directly adhered to a tire inner surface member which is suitably vulcanization-bonded with the resin, or fixed to the tire inner surface via an adhesive layer made of an adhesive and an adhesive rubber. The preferred form of adherence is vulcanization bonding (direct adherence) since vulcanization bonding can be performed during a normal manufacturing process of the tire and results in a high adhesive strength. Further, when an adhesive layer is provided, the adhesive layer 8 may be disposed on the tire side with only the resin reinforcement member sandwiched between the fastener components 3a, 3b (FIG. 4A), or the resin reinforcement member and the adhesive layer 8 may be combined and sandwiched between the fastener components 3a, 3b (FIG. 4B).

In the present technology, a stiffness constant S expressed by a product of a storage elastic modulus K (GPa) of the resin film or resin sheet and a thickness T (mm) of the resin film or resin sheet preferably satisfies 0.005≤S≤5. This is because this range is the most effective for durability during tire running. In particular, a fixing strength of the fastener is inadequate when the stiffness is too low, and a followability of an inner surface distortion deteriorates when the stiffness is too high. Further, the fastener fixing strength is inadequate when the resin film or resin sheet is too thin, and the followability of the inner surface distortion deteriorates when the resin film or resin sheet is too thick. Alternatively, a plurality of thin resin films or resin sheets may be layered to satisfy the stiffness constant described above.

A more preferred stiffness constant S satisfies 0.01≤S≤1.0. Note that, when there is a plurality of resin films or resin sheets, the thickness T (mm) of the resin film or resin sheet is a total thickness of the plurality of resin films or resin sheets (limited to the resin films or resin sheets). When a layer other than the resin film or resin sheet exists, the thickness of that layer is not included in the measured value.

Further, a surface area S2 (cm$^2$) per mechanical fastener of the resin film or resin sheet sandwiched between the fastener components is preferably from 8 to 300 cm$^2$. The adhesive strength to the tire inner surface is inadequate when the surface area of the resin film or resin sheet is too small, and the resin film or resin sheet cannot follow the inner surface distortion when the surface area is too large, which is not preferable. According to the discovery of the inventors of the present technology, a surface area of from about 25 to 100 cm$^2$ is generally preferred. Note that "surface area S (cm$^2$) per mechanical fastener of the resin film or resin sheet sandwiched between the fastener components" is a surface area based on the surface area of the used resin film or resin sheet developed on a flat surface. When any hole is formed for fastener attachment, the surface area S is obtained by subtracting the area of the hole from the surface area of the resin film or resin sheet. When the resin films or resin sheets are layered slightly shifted from each other or the like, a projected area of the entirety of the resin films or resin sheets is defined as "surface area of the resin film or resin sheet."

In the present technology, the mechanical fastener 3 is preferably disposed so that a profile line of the mechanical fastener 3 is at least 2 mm away from a profile line of the resin reinforcement member 7 and is positioned on an inner side of the profile line of the resin reinforcement member. This is because, when the mechanical fastener is too close to the profile line of the resin reinforcement member, the risk of failure caused by the profile line of the resin reinforcement member increases.

Further, a profile shape of the mechanical fastener 3 obtained by projecting the mechanical fastener 3 onto the tire inner surface preferably exhibits a distance R from a center of gravity position of the profile shape to a farthest point on the profile line of from 2 to 60 mm. While a diameter of the fastener mounted to the tire inner surface has a preferred lower limit size to ensure the fixing strength, too large of a diameter increases the risk of vulcanization defects during pneumatic tire manufacturing, requiring a preferred upper limit value as well. Thus, according to the discovery of the inventors of the present technology, the distance R described above is from 2 to 60 mm. FIGS. 6A, 6B, 6C, and 6D illustrate the distance R from the center of gravity position to any point on the farthest profile line using a circle, an equilateral triangle, an ellipse, and a gear shape as examples, respectively.

Further, a profile shape of the resin film or resin sheet 7 in a plan view is preferably formed of a curved line having a radius of curvature of at least 5 mm without any acute angle portion, or is formed of a combination of a straight line and a curved line having a radius of curvature of at least 5 mm. Specific exemplary shapes are illustrated in FIGS. 7A to 7D. As illustrated in FIGS. 7A to 7D, preferred exemplary shapes include a rectangular shape, such as a rectangle or square having rounded corner portions (FIG. 7A), a circular shape (FIG. 7B), an elliptical shape (FIG. 7C), and a regular polygonal shape such as a regular hexagonal shape having rounded corner portions.

According to the present technology, an object having a second fastener of the pair of mechanical fasteners can be disposed on the inner surface of the pneumatic tire by engaging with the fastener 3, which pairs with the second fastener and is provided on the tire inner surface side.

The object having the second fastener can be configured to have various functions in line with the increasingly high-tech development of recent pneumatic tires. Examples of such functions include: (a) an electronic circuit including a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member. An object having one or a combination of such functions is a typical example.

The following describes the resins as well as the elastomer blended with the resins that can be used to form the resin film or resin sheet used in the present technology.

Preferable examples of thermoplastic resin that can be used as a resin that can constitute the resin film or resin sheet in the present technology include a polyamide resin (e.g., nylon 6 (N6), nylon 66 (N66), nylon 46 (N46), nylon 11 (N11), nylon 12 (N12), nylon 610 (N610), nylon 612 (N612), a nylon 6/66 copolymer (N6/66), a nylon 6/66/610 copolymer (N6/66/610), nylon MXD6 (MXD6), nylon 6T, nylon 9T, a nylon 6/6T copolymer, a nylon 66/PP copolymer, a nylon 66/PPS copolymer) and an N-alkoxyalkyl compound thereof, e.g., a methoxymethyl compound of nylon 6, a methoxymethyl compound of a nylon 6/610 copolymer, or a methoxymethyl compound of nylon 612; a polyester resin (e.g., an aromatic polyester such as polybutylene terephthalate (PBT), polyethylene terephthalate (PET), polyethylene isophthalate (PEI), a PET/PEI copolymer, polyarylate (PAR), polybutylene naphthalate (PBN), a liquid crystal polyester, a polyoxyalkylene diimide acid/polybutylene terephthalate copolymer); a polynitrile resin (e.g., polyacrylonitrile (PAN), polymethacrylonitrile, an acrylonitrile/styrene copolymer (AS), a (meta)acrylonitrile/styrene copolymer, a (meta)acrylonitrile/styrene/butadiene copolymer), a polymethacrylate resin (e.g., polymethyl-methacrylate (PMMA), polyethyl-methacrylic acid), a polyvinyl resin (e.g., polyvinyl acetate, a polyvinyl alcohol (PVA), a vinyl alcohol/ethylene copolymer (EVOH), polyvinylidene chloride (PVDC), polyvinylchloride (PVC), a vinyl chloride/vinylidene chloride copolymer, a vinylidene chloride/methylacrylate copolymer, a vinylidene chloride/acrylonitrile copolymer (ETFE)), a cellulose resin (e.g., cellulose acetate, cellulose acetate butyrate), a fluoride resin (e.g., polyvinylidene difluoride (PVDF), polyvinyl fluoride (PVF), polychlorofluoroethylene (PCTFE), a tetrafluoroethylene/ethylene copolymer), and an imide resin (e.g., an aromatic polyimide (PI)).

Further, for the resin and the elastomer that constitute the blend (resin composition) that can be used to constitute the resin film or resin sheet in the present technology, the above may be used as the thermoplastic resin. Preferable examples of the elastomer constituting the blend (resin composition) include a diene-based rubber or a hydrogenate thereof (e.g., a natural rubber (NR), an isoprene rubber (IR), an epoxidized natural rubber, a styrene butadiene rubber (SBR), a butadiene rubber (BR, high cis-BR, and low cis-BR), a nitrile rubber (NBR), hydrogenated NBR, hydrogenated SBR), an olefin rubber (e.g., an ethylene propylene rubber (EPDM, EPM), a maleic acid modified ethylene propylene rubber (M-EPM), a butyl rubber (IIR), an isobutylene and aromatic vinyl or diene-based monomer copolymer, an acrylic rubber (ACM), an ionomer), a halogen-containing rubber (e.g., Br-IIR, Cl-IIR, a brominated isobutylene-p-methylstyrene copolymer (BIMS), a chloroprene rubber (CR), a hydrin rubber (CHR), a chlorosulfonated polyethylene rubber (CSM), a chlorinated polyethylene rubber (CM), a chlorinated polyethylene rubber modified with maleic acid (M-CM)), a silicone rubber (e.g., a methyl vinyl silicone rubber, a dimethyl silicone rubber, a methylphenyl vinyl silicone rubber), a sulfur-containing rubber (e.g., a polysulfide rubber), a fluororubber (e.g., a vinylidene fluoride rubber, a vinyl ether rubber containing fluoride, a tetrafluoroethylene-propylene rubber, a silicon-based rubber containing fluoride, a phosphazene rubber containing fluoride), and a thermoplastic elastomer (e.g., a styrene elastomer, an olefin elastomer, an ester elastomer, a urethane elastomer, a polyamide elastomer).

In particular, it is preferable for at least 50 wt. % of the elastomer to be a halogenated butyl rubber, a brominated isobutylene-paramethyl-styrene copolymer rubber, or a maleic anhydride-modified ethylene a olefin copolymer rubber from the perspective of being able to increase the rubber volume ratio so as to soften and enhance the durability of the elastomer at both low and high temperatures.

In addition, it is preferable for at least 50 wt. % of the thermoplastic resin in the blend to be any one of nylon 11, nylon 12, nylon 6, nylon 6, nylon 66, a nylon 6/66 copolymer, a nylon 6/12 copolymer, a nylon 6/10 copolymer, a nylon 4/6 copolymer, a nylon 6/66/12 copolymer, aromatic nylon, or an ethylene/vinyl alcohol copolymer from the perspective of being able to achieve both durability and air permeation preventive properties.

Moreover, when the compatibility is different upon obtaining a blend by blending a combination of the previously specified thermoplastic resin and the previously specified elastomer, a suitable compatibility agent may be used as a third component to enable compatibilization of both the resin and the elastomer. By mixing the compatibility agent in the blend, interfacial tension between the thermoplastic resin and the elastomer is reduced and, as a result, the particle diameter of the elastomer that forms the dispersion phase becomes very small and thus the characteristics of both components may be realized effectively. In general, such a compatibility agent has a copolymer structure of both or either the thermoplastic resin or the elastomer, or a copolymer structure having an epoxy group, a carbonyl group, a halogen group, an amino group, an oxazoline group, or a hydroxyl group, which is capable of reacting with the thermoplastic resin or the elastomer. While the type of compatibility agent may be selected according to the type of thermoplastic resin and elastomer to be blended, such a compatibility agent generally includes: a styrene/ethylene butylene block copolymer (SEBS) or a maleic acid modified compound thereof; an EPDM, EPM, EPDM/styrene or EPDM/acrylonitrile graft copolymer or a maleic acid modified compound thereof; a styrene/maleic acid copolymer, or a reactive phenoxy, and the like. The blending quantity of such a compatibility agent, while not being particularly limited, is preferably from 0.5 to 10 parts by weight with respect to 100 parts by weight of the polymer component (total of the thermoplastic resin and the elastomer).

A composition ratio of the specified thermoplastic resin and the elastomer in the blend obtained by blending a thermoplastic resin with an elastomer is not particularly limited and may be determined as appropriate to establish a dispersed structure as a discontinuous phase of the elastomer in the matrix of the thermoplastic resin, and is preferably within a range of a weight ratio of from 90/10 to 30/70.

In the present technology, a compatibility agent or other polymers may be blended with the thermoplastic resin or the blend of a thermoplastic resin blended with an elastomer, within a range that does not harm the characteristics required for a resin reinforcement member, for example. The purposes of mixing such a polymer are to improve the compatibility between the thermoplastic resin and the elastomer, to improve the molding workability of the material, to improve the heat resistance, to reduce cost, and the like. Examples of the material used for the polymer include polyethylene (PE), polypropylene (PP), polystyrene (PS), acrylonitrile butadiene styrene (ABS), polystyrene-butadiene-styrene (SBS), and polycarbonate (PC).

Furthermore, a reinforcing agent such as a filler (calcium carbonate, titanium oxide, alumina, and the like), carbon black, or white carbon, a softening agent, a plasticizer, a processing aid, a pigment, a dye, or an anti-aging agent that are generally compounded with polymer compounds may be optionally compounded so long as the required characteristics as a reinforcement member are not hindered. The blend of a thermoplastic resin and an elastomer has a structure in which the elastomer is distributed as a discontinuous phase in the matrix of the thermoplastic resin. By adopting such a structure, due to an effect of sufficient flexibility in the reinforcement member and the resin layer being the continuous phase, it is possible to obtain a molding workability equivalent to that of the thermoplastic resin when molding, regardless of the amount of the elastomer, and achieve air permeation preventive properties.

Furthermore, the elastomer blended with the thermoplastic resin can be dynamically vulcanized when being mixed with the thermoplastic resin. A vulcanizer, a vulcanization aid, vulcanization conditions (temperature, time), and the like, during the dynamic vulcanization can be determined as appropriate in accordance with the composition of the elastomer to be added, and are not particularly limited.

When the elastomer in the thermoplastic resin composition is dynamically vulcanized in this manner, the obtained resin film or resin sheet becomes a film or sheet that contains a vulcanized elastomer. Therefore, the sheet has resistance (elasticity) against deformation from the outside, which is preferable in that the effect of the present technology can be enhanced.

Generally available rubber vulcanizers (crosslinking agents) can be used as the vulcanization agent. Specifically, as a sulfur-based vulcanizer, powdered sulfur, precipitated sulfur, highly dispersible sulfur, surface treated sulfur, insoluble sulfur, dimorpholine disulfide, alkylphenol disulfide, and the like can be exemplified, and, for example, about 0.5 to 4 phr (in the present specification, "phr" refers to parts by weight per 100 parts by weight of an elastomer component; same hereinafter) can be used.

Moreover, examples of an organic peroxide-based vulcanizer include benzoyl peroxide, t-butyl hydroperoxide, 2,4-dichlorobenzoyl peroxide, 2,5-dimethyl-2,5-di(t-butyl peroxy)hexane, 2,5-dimethylhexane-2,5-di(peroxyl benzoate), and the like. Such an organic peroxide-based vulcanizer can be used in an amount of, for example, from around 1 to 20 phr.

Furthermore, examples of a phenol resin-based vulcanizer include brominated alkylphenol resins and mixed crosslinking system containing an alkyl phenol resin with a halogen donor such as tin chloride and chloroprene. Such a phenol resin-based vulcanizer can be used in an amount of, for example, from around 1 to 20 phr.

Examples of other vulcanizers include zinc oxide (about 5 phr), magnesium oxide (about 4 phr), litharge (from about 10 to 20 phr), p-quinone dioxime, p-dibenzoylquinone dioxime, tetrachloro-p-benzoquinone, poly-p-dinitrosobenzene (from about 2 to 10 phr), and methylenedianiline (from about 0.2 to 10 phr).

As necessary, a vulcanization accelerator may be added. As the vulcanization accelerator, from about 0.5 to 2 phr, for example, of a generally available vulcanization accelerator of an aldehyde-ammonia base, a guanidine base, a thiazole base, a sulfenamide base, a thiuram base, a dithio acid salt base, a thiourea base, or the like can be used.

Specific examples include an aldehyde ammonia vulcanization accelerator such as hexamethylene tetramine and the like; a guanidine vulcanization accelerator such as diphenyl guanidine and the like; a thiazole vulcanization accelerator such as dibenzothiazyl disulfide (DM), 2-mercaptobenzothiazole and its Zn salt, a cyclohexylamine salt, and the like; a sulfenamide vulcanization accelerator such as cyclohexyl benzothiazyl sulfenamide (CBS), N-oxydiethylene benzothiazyl-2-sulfenamide, N-t-butyl-2-benzothiazole sulfenamide, 2-(thymol polynyl dithio)benzothiazole, and the like; a thiuram vulcanization accelerator such as tetramethylthiuram disulfide (TMTD), tetraethylthiuram disulfide, tetramethylthiuram monosulfide (TMTM), dipentamethylenethiuram tetrasulfide, and the like; a dithionate vulcanization accelerator such as Zn-dimethyl dithiocarbamate, Zn-diethyl dithiocarbamate, Zn-di-n-butyl dithiocarbamate, Zn-ethylphenyl dithiocarbamate, Te-diethyl dithiocarbamate, Cu-dimethyl dithiocarbamate, Fe-dimethyl dithiocarbamate, pipecoline pipecolyl dithiocarbamate, and the like; and a thiourea vulcanization accelerator such as ethylene thiourea, diethyl thiourea, and the like. Additionally, a vulcanization accelerator which is generally-used for a rubber can be used. For example, zinc oxide (about 5 phr), stearic acid, oleic acid and their Zn salts (from about 2 to 4 phr), or the like can be used.

EXAMPLES

Working Examples 1 to 5 and Comparative Example 1

Figure 7A:
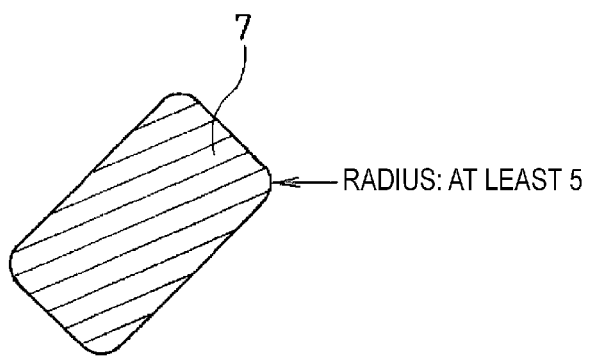
FIGS. 7A to 7D are each a plan view illustrating an exemplary preferred shape of a resin film or resin sheet 7 that can be used in the present technology, and are each particularly a drawing for explaining a profile shape of the resin film or resin sheet 7 in a plan view.
Figure 7B:
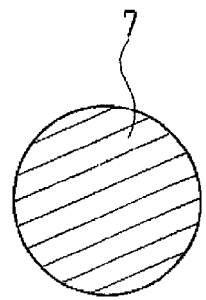
Figure 7C:
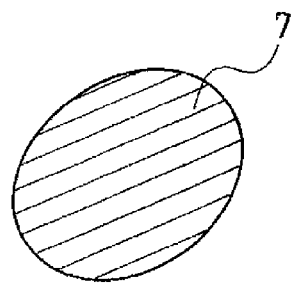
Figure 7D:
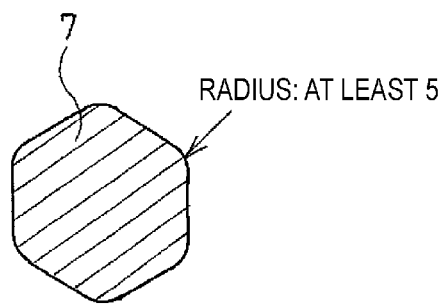

Using the configuration illustrated in FIG. 6A and the resin reinforcement member indicated in Table 1, one mechanical fastener member 3 was vulcanization-bonded with the resin reinforcement member illustrated in FIG. 7B as the mechanical fastener member on the inner surface near the center of each pneumatic tire (195/65R15) by a vulcanization molding process of the tire. The position where the fastener is fixed, the properties of the resin reinforcement member, and the like are indicated in Table 1.

TABLE 1-1

|  | Comparative Example 1 | Working Example 1 | Working Example 2 |
|---|---|---|---|
| Type (thickness) of reinforcement member sandwiched between fastener components | Rubber reinforcement member (0.05 mm) | Resin reinforcement member (0.05 mm) | Resin reinforcement member (0.05 mm) |
| Shape of resin reinforcement member Distance R from center of gravity | Circular R = 20 mm | Circular R = 20 mm | Circular R = 20 mm |
| Attachment position of resin reinforcement | D/W = 0.4 | D/W = 0.4 | D/W = 0 (on equator) |

TABLE 1-1-continued

| | Comparative Example 1 | Working Example 1 | Working Example 2 |
|---|---|---|---|
| member | | | |
| Presence/absence of vulcanization bonding | Present | Absent | Absent |
| Stiffness constant S of resin reinforcement member | 0.002 | 0.010 | 0.010 |
| Surface area (cm²) of resin reinforcement member | 12 | 12 | 12 |
| Durability | 100 | 110 | 115 |
| Type (thickness) of reinforcement member sandwiched between fastener components | Resin reinforcement member (0.05 mm) | Resin reinforcement member (0.20 mm) | Resin reinforcement member (0.20 mm) |
| Shape of resin reinforcement member Distance R from center of gravity | Circular R = 20 mm | Circular R = 20 mm | Circular R = 40 mm |
| Attachment position of resin reinforcement member | D/W = 0 (on equator) | D/W = 0 (on equator) | D/W = 0 (on equator) |
| Presence/absence of vulcanization bonding | Present | Present | Present |
| Stiffness constant S of resin reinforcement member | 0.010 | 0.040 | 0.040 |
| Surface area (cm²) of resin reinforcement member | 12 | 12 | 50 |
| Durability | 120 | 125 | 130 |

The testing and evaluation methods of the durability of the fastener were performed as follows:

(1) Fastener Durability Test

A weight weighing 100 g was fixed to a mechanical fastener on a tire inner surface of each test tire using a second mechanical fastener of the pair of mechanical fasteners; in this state, a drum running durability test was performed, and the running distance until the fastener on the tire inner surface fell off from the inner surface was found;

Each working example was evaluated by indexing the running distance of Comparative Example 1, which used a rubber sheet, as the standard score (100); Larger index values over 100 indicate greater superiority and the ability to run a longer distance; and this test was a forced test in which the air pressure of the test tire (195/65R15) was 210 kPa, the running speed was 81 km/hour, and the load was increased by 13% of the maximum load every two hours.

As understood from the results obtained from each test tire, the pneumatic tire according to the present technology is a superior pneumatic tire in which the fixing strength of the mechanical fastener is extremely high.

The invention claimed is:

1. A pneumatic tire comprising: a mechanical fastener formed of at least two or more fastener components and attached to a tire inner surface, the mechanical fastener being a first mechanical fastener of a separatable pair of mechanical fasteners;

the two or more fastener components being fixed with a resin reinforcement member sandwiched therebetween, the resin reinforcement member comprising at least one layer of a resin film or resin sheet comprising any of:
(a) a resin composition made of a blend of a resin and an elastomer comprising arranged fibers; or
(b) a resin composition made of a blend of a resin and an elastomer with short fibers compounded therein;
wherein the blend of the resin and the elastomer of (a) or (b) has a structure in which the elastomer is distributed as a discontinuous phase in a matrix of the resin, the resin being a thermoplastic resin; and wherein a profile shape of the mechanical fastener obtained by projecting the fastener onto the tire inner surface exhibits a distance R from a center of gravity position of the profile shape to a farthest point on the profile line of from 8 to 60 mm.

2. The pneumatic tire according to claim 1, wherein an attachment position of the mechanical fastener is within a region in which a distance D (mm) in a tire width direction between a center position C of the mechanical fastener and a tire equator line L satisfies the relationship $0 \leq D/W \leq 0.4$ with respect to a maximum width W (mm) of the tire.

3. The pneumatic tire according to claim 1, wherein an attachment position of the mechanical fastener is within a region in which a tire radial direction height A from a bead toe tip to a center position of the mechanical fastener and a tire cross-sectional height H satisfy the relationship $0.05 \leq A/H \leq 0.4$.

4. The pneumatic tire according to claim 1, wherein the resin reinforcement member fixed between the mechanical fasteners is directly adhered to the tire inner surface or is fixed to the tire inner surface via an adhesive layer at a boundary between the resin reinforcement member and the tire inner surface.

5. The pneumatic tire according to claim 1, wherein a surface area S2 (cm²) per mechanical fastener of the resin film or resin sheet sandwiched between the fastener components is from 8 to 300 cm².

6. The pneumatic tire according to claim 1, wherein the mechanical fastener is disposed so that a profile line of the mechanical fastener is at least 2 mm away from a profile line of the resin reinforcement member and is positioned on an inner side of the profile line of the resin reinforcement member.

7. The pneumatic tire according to claim 1, wherein a profile shape of the resin film or resin sheet in a plan view is formed of a curved line having a radius of curvature of at least 5 mm without any acute angle portion, or is formed of a combination of a straight line and the curved line having a radius of curvature of at least 5 mm.

8. The pneumatic tire according to claim 1, wherein an object comprising a second mechanical fastener that engages with the first mechanical fastener on the tire inner surface is fixed to the tire inner surface by engagement of the first mechanical fastener and the second mechanical fastener.

9. The pneumatic tire according to claim 8, wherein the object comprising the second fastener is formed of one or a combination of (a) an electronic circuit comprising a sensor, (b) a balance weight, (c) a run-flat core, (d) an object on which an oxygen scavenger, a drying agent, and/or an ultraviolet light detecting color fixing agent is applied or mounted, (e) a noise absorbing member, and (f) a surface fastener member.

10. The pneumatic tire according to claim 2, wherein the resin reinforcement member fixed between the mechanical fasteners is directly adhered to the tire inner surface or is fixed to the tire inner surface via an adhesive layer at a boundary between the resin reinforcement member and the tire inner surface.

11. The pneumatic tire according to claim 10, wherein a surface area S2 (cm²) per mechanical fastener of the resin film or resin sheet sandwiched between the fastener components is from 8 to 300 cm².

12. The pneumatic tire according to claim 11, wherein the mechanical fastener is disposed so that a profile line of the mechanical fastener is at least 2 mm away from a profile line of the resin reinforcement member and is positioned on an inner side of the profile line of the resin reinforcement member.

13. The pneumatic tire according to claim 12, wherein a profile shape of the resin film or resin sheet in a plan view is formed of a curved line having a radius of curvature of at least 5 mm without any acute angle portion, or is formed of a combination of a straight line and the curved line having a radius of curvature of at least 5 mm.

14. The pneumatic tire according to claim 13, wherein an object comprising a second mechanical fastener that engages with the first mechanical fastener on the tire inner surface is fixed to the tire inner surface by engagement of the first mechanical fastener and the second mechanical fastener.

15. The pneumatic tire according to claim 1, wherein the mechanical fastener is disposed so that a profile line of the mechanical fastener is at least 2 mm away and not greater than 3.5 mm away from a profile line of the resin reinforcement member and is positioned on an inner side of the profile line of the resin reinforcement member.

* * * * *